United States Patent Office 2,967,862
Patented Jan. 10, 1961

2,967,862

ANTHRAQUINONE 1,2,4-TRIAZINES

William L. Berry, Neshanic, and William L. Mosby, North Plainfield, N.J., assignors to American Cyanamid Company, New York, N.Y., a corporation of Maine No Drawing. Filed Oct. 12, 1959, Ser. No. 845,635

4 Claims. (Cl. 260—249)

This invention relates to new anthraquinone 1,2,4-triazines and dihydrotriazines of the structures

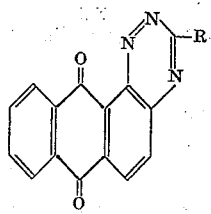

and

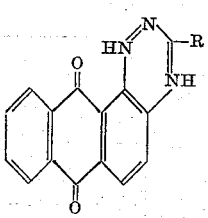

in which R is selected from the group consisting of anthraquinonyl, 1-chloro-2-anthraquinonyl, 1-methoxy-2-anthraquinonyl and 1-amino-2-anthraquinonyl. These compounds are new vat dyes and vat pigments of deep shades.

We have found that when an anthraquinonyl-2-carbohydrazide is reacted with 1-chloro-2-nitroanthraquinone a nitrohydrazino anthraquinone of the structure

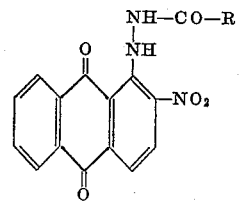

in which R is the 2-anthraquinonyl radical is formed. When such a compound is treated with a reducing agent, the nitro group upon reduction, effects a ring closure to form a dihydrotriazine of the structure

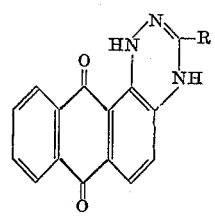

which is readily oxidized, even during recrystallization, to form the triazine of the formula first given. The reduction of the nitro compound is effected either by an alkaline reagent such as sodium sulfite or by a catalytic hydrogenation, such as with hydrogen over palladium and charcoal. The latter is preferred since the use of sodium sulfide always causes the formation of some oxadiazine as well as the dihydrotriazine, due to the alkalinity of the reagent.

The 2-anthraquinonyl carbohydrazides which are used as starting materials are prepared from the various available anthraquinonyl-2-carboxy chlorides and hydrazine. Examples of 2-anthraquinonyl carboxy chlorides which may be used are the carboxy chlorides of anthraquinone-2-carboxylic acid, 1-chloroanthraquinone-2-carboxylic acid, 1-methoxyanthraquinone-2-carboxylic acid, 1-aminoanthraquinone-2-carboxylic acid and the like.

These new 1,2,4-triazines of our invention are useful as vat dyes having very deep shades of reds, violets and blues. They can be used as vat dyes or as vat pigments for the coloration of resins and hydrocarbons such as gasolines.

Our invention can be illustrated by the following examples in which parts are by weight unless otherwise specified.

Example 1

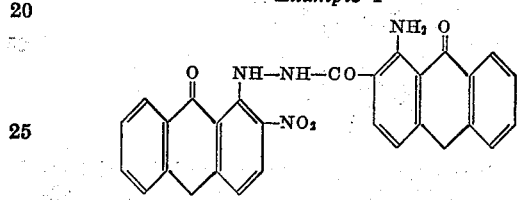

A mixture of 21 parts of 1-chloro-2-nitro-anthraquinone, 20 parts of 1-amino anthraquinone-2-carbohydrazide and 1500 parts by volume of ortho-dichlorobenzene is stirred at 160° C. until the reaction is substantially complete. The reaction mixture is cooled and the dull red solid which separates is isolated by filtration.

Similarly when equivalent quantities of anthraquinone-2-carbohydrazide, 1-chloroanthraquinone-2-carbohydrazide or 1-methoxyanthraquinone-2-carbohydrazide are used in place of the 1-aminoanthraquinone-2-carbohydrazide a similar product is obtained.

Example 2

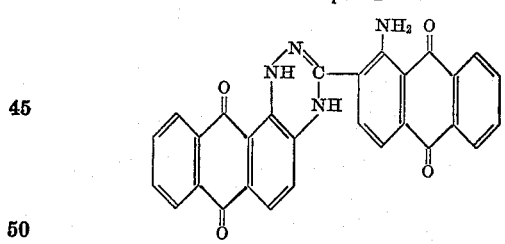

A mixture of 30 parts of the product of Example 1, 50 parts of sodium sulfide nonahydrate and 400 parts of pyridine and 600 parts of water were allowed to stir at room temperature until the reaction was substantially complete. The deep blue black product is then isolated by filtration and washing. It can be purified by recrystallization from trichlorobenzene.

When the other substituted anthraquinone products described in Example 1 are similarly treated, similar dihydrotriazines are obtained.

Example 3

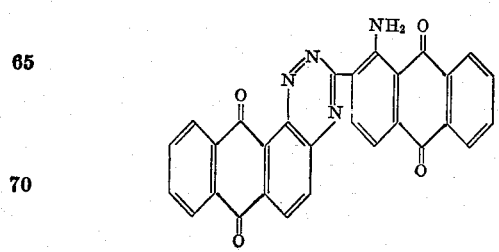

The product of Example 2, upon recrystallization from nitrobenzene, is found to be oxidized to the triazine, obtained as a burgundy red solid which dyes cotton a reddish-brown shade from a light brownish-yellow vat.

The other anthraquinonyl-1,2,4-triazines are similarly oxidized upon recrystallization from nitrobenzene. Oxidation can also be effected by stirring a solution with an oxidizing agent such as peracetic acid, chloranil, and/or by aerating such a solution.

*Example 4*

Five parts of the product of Example 3 is milled with 100 parts of polyvinylchloride, 50 parts of di-2-ethylhexyl phthalate, 2 parts of barium cadmium laurate and 1 part of a triarylphosphite. The milled product is then molded in a standard manner, to yield a deep red brown sheet of polyvinylchloride.

We claim:
1. Compounds of the structure

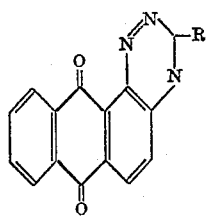

in which R is selected from the group consisting of 2-anthraquinonyl, 1-chloro-2-anthraquinonyl, 1-methoxy-2-anthraquinonyl and 1-amino-2-anthraquinonyl.

2. The compound of the formula

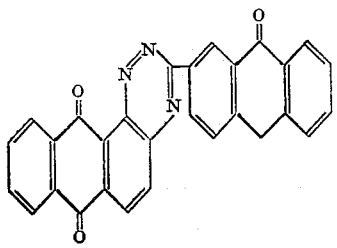

3. The compounds of the structure

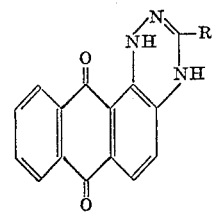

in which R is selected from the group consisting of 2-anthraquinonyl, 1-chloro-2-anthraquinonyl, 1-methoxy-2-anthraquinonyl, and 1-amino-2-anthraquinonyl.

4. The new compound

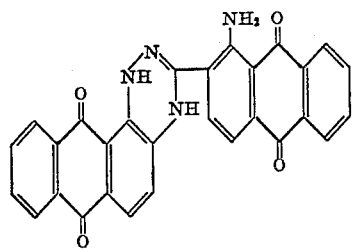

References Cited in the file of this patent
FOREIGN PATENTS
291,983    Germany _____ Jan. 31, 1914

OTHER REFERENCES

Lubs: The Chemistry of Synthetic Dyes and Pigments, p. 530, Reinhold Publishing Corp. (1955).

Erickson et al.: The 1,2,3- and 1,2,4-triazines, tetrazines and pentazines [vol. 10 of The Chemistry of Heterocyclic Compounds], chapter II, pp. 113–123, Interscience Publishers, Inc., N.Y. (1956).

UNITED STATES PATENT OFFICE
Certificate of Correction

Patent No. 2,967,862  
January 10, 1961

William L. Berry et al.

It is hereby certified that error appears in the above numbered patent requiring correction and that the said Letters Patent should read as corrected below.

Column 1, lines 27 to 36, the formula should appear as shown below instead of as in the patent:

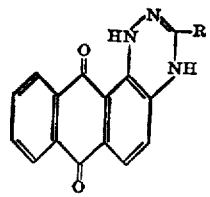

same column 1, line 70, for "sulfite" read —sulfide—; column 2, lines 20 to 28, the formula should appear as shown below instead of as in the patent:

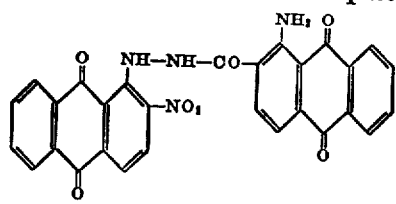

column 3, lines 20 to 29, the formula should appear as shown below instead of as in the patent:

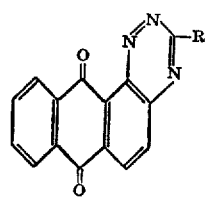

same column 3, lines 35 to 44, the right-hand portion of the formula should appear as shown below instead of as in the patent:

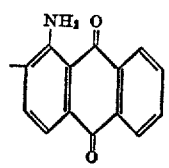

Signed and sealed this 26th day of September 1961.

[SEAL]
Attest:

ERNEST W. SWIDER,  
*Attesting Officer.*

DAVID L. LADD,  
*Commissioner of Patents.*